United States Patent
Johansson

(10) Patent No.: US 7,713,339 B2
(45) Date of Patent: *May 11, 2010

(54) FILTER CHANGE INDICATOR

(75) Inventor: Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 963 days.

This patent is subject to a terminal disclaimer.

(21) Appl. No.: 11/420,655

(22) Filed: May 26, 2006

(65) Prior Publication Data

US 2007/0272081 A1    Nov. 29, 2007

(51) Int. Cl.
*B01D 46/00* (2006.01)

(52) U.S. Cl. .............. 96/417; 96/421; 96/423; 55/DIG. 34; 116/70; 116/266; 116/DIG. 25; 340/607; 340/686.1

(58) Field of Classification Search .............. 96/423, 96/417, 421; 55/DIG. 34; 116/70, 266, DIG. 25; 340/607, 686.1
See application file for complete search history.

(56) References Cited

U.S. PATENT DOCUMENTS

| | | | |
|---|---|---|---|
| 3,595,200 A * | 7/1971 | Cilento | 116/267 |
| 3,928,006 A | 12/1975 | Martineau | |
| 4,321,070 A | 3/1982 | Bede | |
| 4,629,479 A * | 12/1986 | Cantoni | 96/55 |
| 5,352,255 A | 10/1994 | Taft | |
| 6,168,646 B1 * | 1/2001 | Craig et al. | 95/14 |
| 6,320,513 B1 | 11/2001 | Timmons, Jr. | |
| 6,494,940 B1 | 12/2002 | Hak | |
| 6,734,801 B2 | 5/2004 | Scofield | |
| 6,888,466 B2 | 5/2005 | Dermody | |
| 2002/0029733 A1 | 3/2002 | Timmons, Jr. | |
| 2004/0001003 A1 | 1/2004 | Scofled | |
| 2004/0112273 A1 | 6/2004 | Thoede et al. | |
| 2007/0272082 A1 * | 11/2007 | Johansson | 96/417 |

FOREIGN PATENT DOCUMENTS

| | | |
|---|---|---|
| KR | 20-0108060 Y1 | 10/1997 |
| KR | 10-2005-0089940 A | 9/2005 |
| KR | 10-2006-0041379 A | 5/2006 |

* cited by examiner

*Primary Examiner*—Robert J Hill, Jr.
*Assistant Examiner*—Chirstopher P Jones
(74) *Attorney, Agent, or Firm*—David B. Patchett

(57) ABSTRACT

An air filter monitoring system for indicating when to clean or replace a flexible air filter includes an air filter having a peripheral frame and an interior filtering region, a fixed support structure for receiving the air filter and maintaining the perimeter of the filter frame in a generally fixed position while allowing the interior filtering region to flex in response to air flow through the filter, and a filter change indicator having a predetermined bias force. The filter change indicator is arranged to contact the interior filtering region of the filter, wherein when the predetermined bias force is reached, the filter change indicator is activated to notify a user to clean or replace the filter.

13 Claims, 3 Drawing Sheets

FILTER CHANGE INDICATOR

BACKGROUND

The present invention relates generally to systems including filters and, more particularly, to an apparatus for indicating when to replace a filter in a system including an air filter.

Disposable air filters are commonly used in commercial and residential heating, ventilating and air conditioning (HVAC) systems, and in portable air purification units. Such filters typically include a frame, a fibrous non-woven filter material, and a reinforcing structure that supports the filter material. After a period of use, these filters become dirty or clogged and must be cleaned or replaced. Proper filter maintenance helps keep the HVAC equipment operating at maximum efficiency and reduces operating costs. Depending on the operating conditions, filter replacement may be required several times a year.

Filter replacement is typically done on a regular, fixed-interval basis. That is, the filter is replaced after a certain recommended fixed period of time, such as three months, has passed. This fixed period of time, however, may not be appropriate for a given situation. For example, the fixed time period may be too short, in which case the filter is discarded prematurely, or the fixed time period may be too long, in which case the filter is used beyond the time when it should have been changed. Individuals may also lose track of when the filter was last changed or may forget to change the filter at the appointed time. Changing the filter prematurely is wasteful and results in unnecessary expense, and waiting too long can result in system inefficiency or may negatively impact air quality.

Devices for indicating when to change or clean an air filter are known in the prior art. U.S. Pat. No. 4,321,070 (Bede), for example, discloses a whistle which, when installed in an air filter, emits a shrill tone to signal a predetermined clogged condition of the filter at which time the filter should be cleaned or replaced.

U.S. Pat. No. 3,071,914 (Gesmar) discloses a filter condition indicator for a filter fan using a differential pressure gauge. The differential pressure gauge includes a hollow indicator tube and a float that moves in response to the pressure differential. U.S. Pat. No. 5,668,535 (Hendrix et al) discloses a filter condition sensor and indicator in which a heated thermistor is positioned in a by-pass air flow path.

Residential HVAC systems and portable air purifiers often utilize high performance filters commonly referred to as panel filters or pleated filters. Such filters are available from 3M Company, St. Paul Minn. under the Filtrete™ brand. Such filters have a generally thin flat construction and include a somewhat rigid peripheral frame and an interior filtering region formed from a fibrous non-woven filter media. To improve the performance of such filters, the filter media may be electrostatically charged. Such filters come in a variety of sizes and may include a support structure formed of, for example, wire mesh, paperboard, chipboard or glue strips to provide additional support for the filter media. Even with such support structures, however, the interior filtering region of such filters tends to exhibit a certain degree of bending, flexing, bowing, or bulging when subjected to the load created by air passing through the filter.

Devices that detect a predetermined extent of filter budge to operate an end-of-life signal are also known in the patented prior art. U.S. Pat. No. 3,928,006 (Martineau) discloses a device for signaling dirty filters including a position sensitive electrical switch positioned to detect a predetermined extent of filter bulge, thereby to operate an end-of-filter-life signal. The operation of this device, however, is highly sensitive to the position of the device relative to the filter. To properly adjust the location of the device, a mounting structure is required.

There is still a need for a simple, durable, reliable, inexpensive system and/or device that can accurately indicate when to replace or clean a filter based on the degree of bowing or flexing of the filter. There is also a need for such a device that is less dependant on the precise positioning of the device relative to the filter. That is, there is a need for a filter change indicator that is relatively insensitive to where it is placed in relation to the filter and can, therefore, be positioned at different locations from the filter and still yield accurate output about when to clean or replace the filter.

It would be desirable to provide a small, simple, durable, inexpensive system and/or device that can accurately and reliably indicate to a user when to clean or replace a filter, such as an air filter. It would also be desirable to provide such a device that does not have to be positioned a precise distance from the filter to accurately indicate when to clean or replace the filter, and does not require calibration or repositioning depending on the type of filter used or the operating conditions.

SUMMARY

In one aspect, the apparatus of the present invention provides a system that provides notification of when to clean or replace a flexible air filter which has become unacceptably clogged with filtered particulate matter.

In one embodiment, the present invention provides an air filter monitoring system for indicating when to clean or replace a flexible air filter which includes an air filter having a peripheral frame and an interior filtering region, a fixed support structure for receiving the air filter and maintaining the perimeter of the filter frame in a generally fixed position while allowing at least a portion of the interior filtering region to flex in response to air flow through the filter, and a filter change indicator having a predetermined bias force. The filter change indicator is arranged to contact the interior filtering region of the filter, wherein as the filter becomes loaded with particulate matter, the interior filtering region of the filter will exert an increasing force against the filter change indication, and when the predetermined bias force is reached, the filter change indicator is activated to notify a user to clean or replace the filter. In one aspect, the predetermined bias force may be adjustable.

In a more specific aspect of the invention, the filter change indicator may include a housing, a position sensitive electrical switch arranged in the housing, a filter engagement member arranged to actuate the switch, and a biasing member arranged to resist a force applied to the filter engagement member, wherein as the interior filtering region flexes in response to air flow through the filter, the interior filtering region exerts a force on the switch that increases with the degree of clogging of the filter and, when a predetermined force has been reached, the switch is triggered to notify a user to clean or replace the filter.

In various aspects, the biasing member may be a spring, a resilient material, or a gas filled bladder. In a specific aspect, the biasing member is a helical spring arranged around the filter engagement member.

In other aspects, the filter engagement member may include an extension arm portion and a head portion connected with the extension arm portion, and the helical spring is arranged around the arm portion between the filter change indicator housing and the head portion.

In another embodiment, the filter change indicator may include a housing, a switch arranged in the housing, and a filter engagement member arranged to actuate the switch. In a more specific embodiment, the switch itself may include a biasing member or the switch itself may be a biasing member.

In other aspects, the filter change indicator may be arranged: (1) adjacent the downstream side of the filter adjacent the interior filtering region, (2) to contact the interior filtering region of the filter before the switch is activated, or (3) to contact the interior filtering region of the filter when air is flowing through a new clean filter.

The air filter monitoring system of the present invention may be incorporated into a portable self-contained room air purification system, or into a central residential or commercial air handling system.

In a specific embodiment, the head portion of the filter engagement member may include openings to minimize the impact the head portion has on the flow of air through the filter.

In a specific embodiment, the present invention provides a portable room air purifying device including a chassis including an air filtering chamber having an air inlet opening and an air discharge opening, a pleated flat-panel filter mounted in the filtering chamber between the inlet and the discharge openings, the filter including a peripheral frame mounted in a fixed position relative to the chassis and including a flexible interior filtering region comprising fibrous filter media that bows outwardly with respect to the frame when air flows through the filter, and a filter change indicator arranged at a predetermined stationary location relative to the chassis, the filter change indicator including a housing, a switch arranged in the housing, a filter engagement member arranged to actuate the switch in response to the bowing of the filter, and a biasing member arranged to resist a force applied to the filter engagement member.

The present invention also provides an air filter change indicator including a housing, a switch arranged in the housing, a filter engagement member movably connected with the housing and arranged to actuate the switch in response to the bowing of the filter, and a biasing member arranged to resist a force applied to the filter engagement member.

In various embodiments, the biasing member may be arranged inside the housing, the biasing member may be included as part of the switch, or the biasing member may be arranged exterior to the housing.

In this application, "filtered particulate material", "filtered particulates", "particulate material" and "particulate debris" refer to dirt, dust, pollen, mold, smoke, pet dander, micro-organisms or any other airborne particles filtered from the air stream as air passes through the filter media.

Advantages of certain embodiments of the invention include providing a small, durable, reliable, inexpensive system and/or device that is easy to install and easy to use, and is able to accurately and reliably indicate when to clean or change a filter, such as an air filter. The invention provides a device that can be incorporated into new systems or can be easily retrofit into existing systems.

BRIEF DESCRIPTION OF THE DRAWINGS

The present invention will be further described with reference to the accompanying drawings, in which.

DETAILED DESCRIPTION

Figure 1:
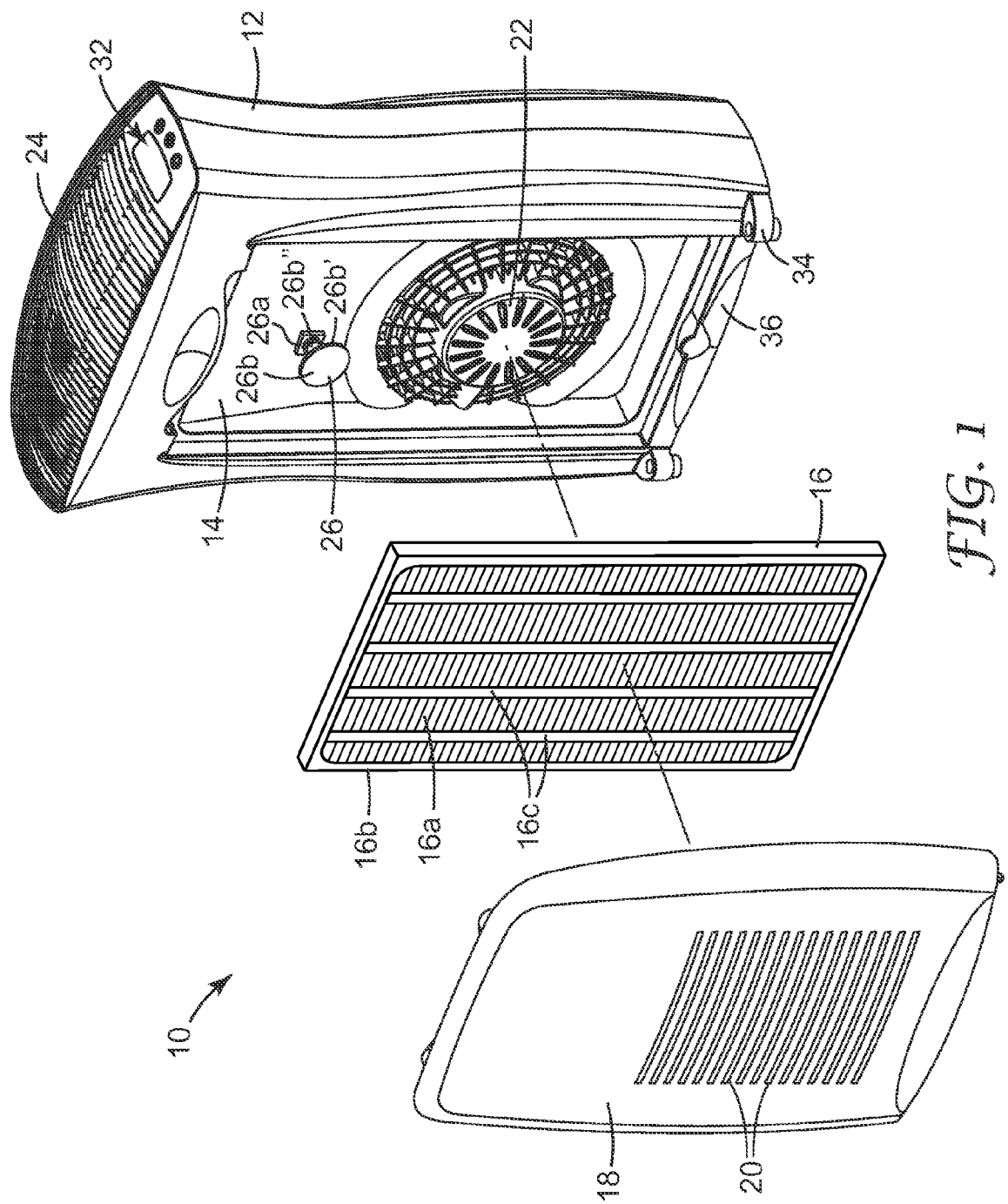
FIG. 1 is an exploded view of a portable air purifying unit including a filter change indicator according to the invention.

Referring now to the drawings, wherein like reference numerals refer to like or corresponding parts throughout the several views, FIG. 1 shows a portable air purification unit 10 generally including a chassis 12 having an interior air handling chamber 14, a filter 16 removably arranged in the chamber 14, and a cover 18 removably arranged over the filter 16. Although the invention is shown and described below in reference to a portable air purification unit, the invention may also be incorporated into, for example, a central residential, industrial, or commercial HVAC system.

The cover 18 includes a grill with air intake openings 20 that allow unfiltered air to enter the air handling chamber 14 and pass through the filter 16, whereby entrained contaminants such as dirt, dust, pollen, mold, smoke, pet dander, micro-organisms or any other airborne particles that can be captured by the particular filter used are removed from the air stream.

The present invention is not limited for use with any particular type of filter media or filter construction, and may be used with any conventional filter construction, so long as the filter media exhibits some degree of flexibility and tends to bow outwardly a certain minimal distance in response to an air stream passing through the filter. Such filters include, for example, conventional pleated, flat-panel type filters formed of fibrous non-woven materials, which may or may not include a secondary reinforcing structure to provide additional support for the filter media, and filters that include somewhat stiff filter media.

In the illustrated embodiment, the filter 16 is a pleated, flat-panel type of filter including pleated filter media defining an interior filtering region 16a of the filter. The filter media is typically a fibrous non-woven material which may be electrostatically charged to enhance its particle capturing ability. The interior filtering region 16a is surrounded by an optional peripheral frame 16b. The frame 16b is constructed to provide a somewhat stiff support structure that allows the filter 16 to be mounted in the air purification unit 10. By stiff, it is generally meant that the frame 16b is able to withstand forces typically encountered by a filter in a given installation. That is, the frame 16b may deform somewhat during the operation of the system, but will generally retain its overall shape and will not buckle or otherwise be permanently deformed when used as intended. The frame 16b may be formed of, for example, paperboard, chipboard or a synthetic plastic material. It will be recognized that the frame 16b may be omitted so long as the periphery of the filter media can be secured in a manner that allows it to remain in a fixed position relative to the chassis 12 when air is forced through the filter, and so long as the interior filtering region 16a tends to flex to a measurable degree in response to the air stream.

In the illustrated embodiment, the filter 16 includes an optional secondary reinforcing structure 16c arranged across the face of the interior filtering region 16a to provide the filter media with added support and/or to provide pleat spacing. The reinforcing structure 16c may comprise, for example, wire mesh, paperboard, chipboard, glue coated string, or strands of glue applied across the pleated filter media. In the illustrated embodiment, the secondary reinforcing structure 16c is formed of strands of glue applied across the pleated filter media. A suitable filter having a secondary reinforcing structure formed from strands of glue is disclosed in U.S. Patent Publication No. 2006/0005517 (Duffy et al.), the entire contents of which are hereby incorporated by reference. Even with the secondary reinforcing structure 16c, the interior filtering region 16a will tend to bow outwardly in the downstream direction as air passes through the filter 16.

Alternatively, the filter media itself may be sufficiently stiff so that no secondary reinforcing structure is needed. Filters formed of such stiff filter media typically exhibit a certain degree of bowing when subjected to an air stream and will experience increased bowing as the filter becomes increasingly loaded with filtered particulate material, which makes filters formed of such filter media suitable for use in the present invention. A filter without a secondary reinforcing structure may be constructed using, for example, BBA Melfab 80 media, a fibrous polypropylene nonwoven media available from BBA Fiberweb Terram Limited, Gwent, United Kingdom. The filter may be produced by pleating the Melfab 80 media and then heat setting the pleats.

A centrifugal fan 22 is arranged in the chassis 12 to draw unfiltered air through the air intake openings 20 of the cover 18, through the filter 16, and into the air handling chamber 14. After the air passes through the filter 16, the filtered air exits the chassis 12 through the exit grill 24.

Figure 2:
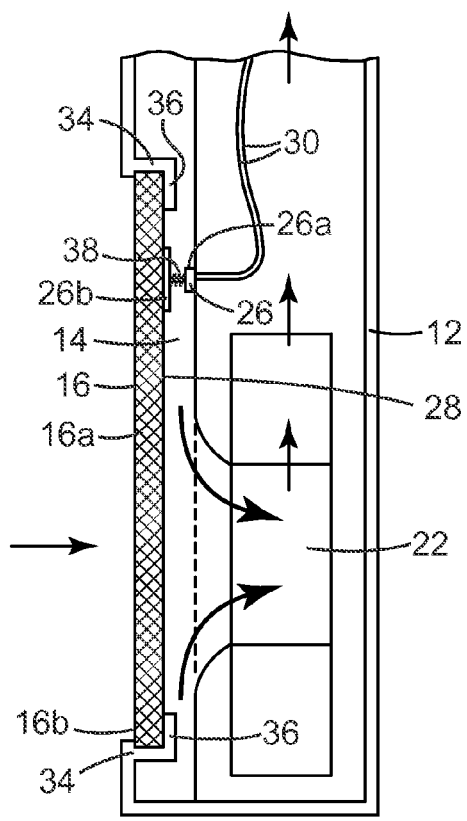
FIG. 2 is a diagrammatic side view showing the primary internal components of an air handling system including a filter and a filter change indicator.
Figure 3A:
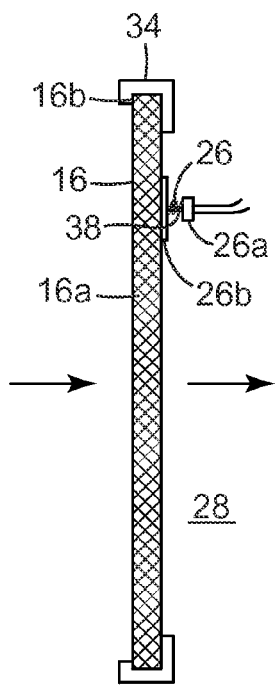
FIG. 3a is a side view showing the position of the filter and the filter change indicator for a new or relatively clean filter.
Figure 3B:
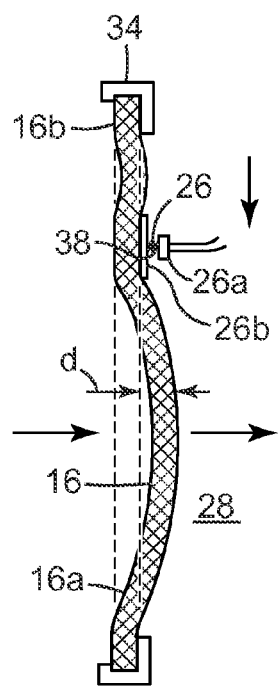
FIG. 3b is a side view showing the filter of FIG. 3a in a displaced position after it has been used for a period of time and become loaded with particulate debris and the filter change indicator is in its activated condition.

In accordance with a characterizing aspect of the air purification unit 10, a filter change indicator 26 is mounted in the air handling chamber 14 adjacent the downstream side 28 of the filter 16. FIGS. 2 and 3a show the filter 16 in its initial undisplaced position, and FIG. 3b shows the filter 16 in its displaced position (displaced a distance "d" from its initial undisplaced position). The initial undisplaced position generally corresponds to either the location of the filter 16 when the unit 10 is off and no air is being forced through the filter 16, or to the location of the filter 16 when the unit 10 is on and air is being forced through the filter 16 but the filter is new, or relatively new, and has not yet experienced a significant degree of loading, such that air can readily pass through the filter without significantly flexing or deforming the filter. The displaced position generally corresponds to the location of the filter after the filter has experienced some degree of loading and the filter flexes or bows outwardly in the downstream direction when air is forced through the filter.

Figure 4:
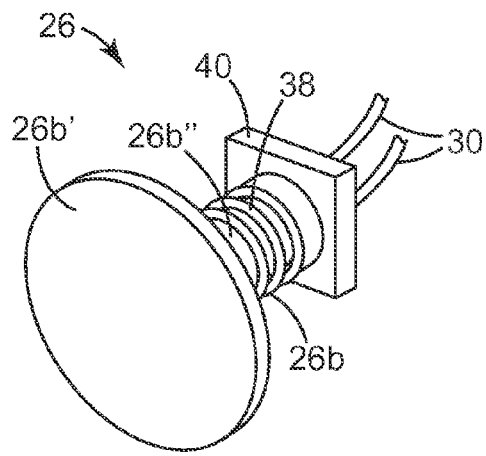
FIG. 4 is an enlarged perspective view of a filter change indicator according to the invention.
Figure 5:
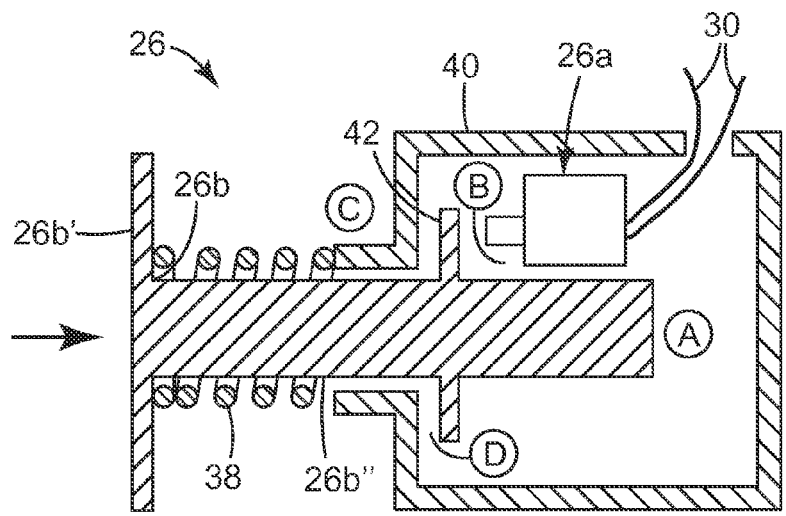
FIG. 5 is a diagrammatic cross-sectional side view of the filter change indicator of FIG. 4.

Referring to FIGS. 4 and 5, the filter change indicator 26 includes an optional housing 40, a switch 26a arranged in the housing 40 and which is triggered when a pre-determined force is applied to the filter change indicator 26 via a filter engagement member 26b which is movably connected with the housing 40 and is contacted by the interior filtering region 16a of the filter 16 when the filter bows in response to air flow and is arranged to actuate the switch 26a, and a biasing member 38 arranged to resist a force applied to the filter engagement member 26b. A switch 26a suitable for use in the filter change indicator 26 is available from Omron Electronic Components LLC, Schaumburg, Ill. under the product designation Snap Action Switch D2F. Other electronic switches, and other conventional switches may also be used.

As shown most clearly in FIGS. 4 and 5, the biasing member 38 is a conventional helical spring arranged adjacent the exterior of the housing 40 around a portion of the filter engagement member 26b. The particular location selected for the biasing member 38 is not significant to the invention hereof, so long as the location allows the biasing member 38 to resist a force applied to the filter engagement member 26b. It will therefore be recognized that the biasing member 38 may also be located, for example, at positions "A", "B" and "D" shown in FIG. 5. If located at position "D", however, the biasing member 38 will be placed in tension to resist the force applied to the filter engagement member 26b. Thus, to effectively resist the applied force, the biasing member 38 must be secured to the shoulder surface 42 of the filter engagement member 26b and to the adjacent inner surface of the housing 40.

It will also be noted that the particular location selected for the switch 26a is not significant to the invention, so long as the location allows the switch 26a to sense when the filter engagement member 26b has been displaced some predetermined distance. Thus, it will be recognized that the switch 26a may also be located, for example, at positions "A", "C", or "D" shown in FIG. 5. If located at position "D", however, the switch would have to be one which would be actuated as the pressure is released from, rather than as it is applied to, the switch.

The particular biasing member 38 is also not significant to the invention hereof, so long as it provides the desired function of resisting a force applied to the filter engagement member 26b. Suitable biasing members 38 include, for example, springs, compressible and/or resiliently extensible materials, or a gas filled bladder.

In the illustrated embodiment, the filter change indicator 26 is mounted on the inner surface of the air handling chamber 14 at a location offset from the center of the filter 16. That is, the filter condition indicator 26 is mounted at a location beyond the outer perimeter of the fan impeller when viewing the unit 10 straight on from the front. The change indicator 26, however, may also be mounted at or near the center of the interior filtering region 16a of the filter 16.

The filter engagement member 26b may be mounted in direct contact with the interior filtering region 16a, immediately adjacent the interior filtering region 16a, or the filter engagement member 26b may be spaced from the interior filtering region 16a a predetermined distance.

A pair of wires 30 connect the filter change indicator 26 to a display 32 located on the top of the chassis 12. The display 32 may include audio and/or visual output to inform a user that the filter 16 is in need of maintenance. The maintenance to be provided may be in the form of either cleaning the filter or replacing the filter. In the case where the filter change indicator is used in conjunction with a central residential HVAC system including a remotely located thermostat unit, the display may be provided near, with, or be incorporated into, the remotely located thermostat unit.

As shown most clearly in FIGS. 2 and 3a, the filter 16 is mounted in the air handling chamber 14 via a support structure 34. In the illustrated embodiment, the support structure 34 comprises tabs 36 that form slots for receiving the peripheral frame portion 16b of the filter 16, and thereby serve to maintain the perimeter of the filter in a generally fixed position while allowing the interior filtering region 16a to flex in response to air flow through the filter 16.

It will be understood that as air passes through the filter 16, the interior filtering region 16a will have a tendency to bow outwardly in the downstream direction. Once the filter 16 contacts the filter engagement member 26b, however, additional bowing or flexing of the interior filtering region 16a—in the area in contact with the filter engagement member 26b—is inhibited because the filter engagement member 26 does not move significantly. The force seen by the filter engagement member 26b is therefore produced by the interior filtering region 16a pushing against the filter engagement member 26b.

The filter condition indicator 26 is mounted at a fixed position relative to the support structure 34, and the filter engagement member 26b extends outwardly to a position adjacent the downstream side 28 of the interior filtering region 16a of the filter 16. As shown in FIGS. 3a and 3b, when mounted in this manner, as the interior filtering region 16a begins to flex in response to air flow through the filter 16, the interior filtering region 16a bows outwardly in the downstream direction from an initial position (FIG. 3a) to a displaced position (FIG. 3b), and exerts a force against the filter engagement member 26b, which in turn acts against the biasing member 38. The biasing member 38 serves to prevent the switch 26a from being activated or triggered until a certain force necessary to offset the force of the biasing member 38 has been reached. Once the necessary force has been reached, the filter engagement member 26b actuates the switch 26a which creates a signal to notify a user that the filter 16 is in need of cleaning and/or replacement. It will be recognized that the biasing force that must be overcome to actuate the switch 26a may be adjustable, if desired.

The force exerted on the filter engagement member 26b increases as the filter becomes increasingly clogged with filtered particulate material. It will be recognized that the position of the switch 26a must be fixed relative to the support structure 34 so the switch 26a can be actuated when the interior filtering region 16a bows in response to the air stream. That is, the switch 26a remains stationary relative to the chassis 12 when the filter engagement member 26b is acted upon by the force of the bowing filter. The filter change indicator 26 is not particularly sensitive to where it is positioned relative to the filter. For example, the filter change indicator 26 may be placed in contact with the filter or be spaced a small distance from the filter. In addition, the filter change indicator 26 may generally be kept in the same fixed position for different filter constructions. As a result, the position of the filter change indicator 26 does not have to be adjusted or calibrated for different types of filters.

The filter change indicator 26, however, may be located at different fixed positions depending on, for example, the type of filter used and the air flow rate, if necessary. The appropriate fixed position of the filter change indictor 26 can be determined based on, for example, the at rest position of the interior filtering region 16a (i.e. the position of the filter media when no air is passing through the filter), the initial displaced position of the interior filtering region 16a (i.e. the position of the filter media when air is passing through the filter and the filter is new), and the final displaced position of the interior filtering region 16a (i.e. the position of the filter media when air is passing through the filter and the filter is fully loaded with filtered particulates and is in need of cleaning or replacement).

As noted above, the filter change indicator 26 includes a filter engagement member 26b extending outwardly from the switch 26a. The filter engagement member 26b is arranged adjacent the interior filtering region 16a of the filter 16 and serves to actuate the switch 26a as the filter bows outwardly in the downstream direction. The term "adjacent" refers to the filter engagement member 26b being in close proximity to the filter media when the system is inoperative and, thus, no air is passing through the filter 16. Adjacent includes the case where the filter engagement member 26b contacts the interior filtering region 16a of the filter, the case where the filter engagement member 26b is arranged immediately adjacent the interior filtering region 16a of the filter, and the case where the filter engagement member 26b is spaced a nominal distance from the interior filtering region 16a of the filter, wherein the nominal distance generally corresponds to the distance between the at rest position of the interior filtering region 16a and the initial displaced position of the interior filtering region 16a.

Thus, in one embodiment, the filter engagement member 26b may be positioned to contact the filtering region 16a of the filter 16 when the system is off and no air is passing through the filter. Alternatively, the filter engagement member 26b may be spaced a small distance from the filtering region 16a of the filter such that, when the filter is clean and new, and air is passing through the filter, the filtering region 16a will bow outwardly and will be displaced to the location of, and into contact with, the filter engagement member 26b. In one aspect of the invention, the particular location of the filter engagement member 26b is selected so that the filter engagement member 26b is in contact with the filtering region 16a throughout the entire life of the filter, or at least throughout the majority of the life of the filter. In this regard, the position of the filter engagement member 26b may correspond to, or be in the same plane as, the initial bowed-out position of the filtering region 16a—at the location of the filter engagement member 26b—when the filter is new and clean, and air is passing through the filter media at the desired operating flow rate. In addition, the filter engagement member 26b may be initially positioned or forced "into" the filtering region 16a of the filter. That is, the filter engagement member 26b may be urged in the upstream direction into the filter such that the filter engagement member 26b presses against the filtering region 16a of the filter when the unit is not operating.

In the illustrated embodiment, the filter engagement member 26b includes an optional head portion 26b' arranged on the terminal end of an optional extension arm portion 26b". The extension arm portion 26b" is provided to position the head portion 26b' adjacent the surface of the filter 16. Although the head portion 26b' is shown in the form of a thin circular disk, other shapes and thicknesses may be used.

It has been found that when the filter engagement member 26b is provided with a head portion 26b' having a certain surface area and is placed at a specific location adjacent the downstream side of the filter, the switch 26a can more accurately indicate when the filter 16 is in need of cleaning or replacement. In particular, a head portion 26b' having a contact surface area of at least about 2 square inches—in$^2$ (13 square centimeters—cm$^2$) and more typically, at least about 3 in$^2$ (20 cm$^2$) has been found to produce reliable repeatable results for conventional pleated residential furnace air filters.

If the area of the head portion 26b' is too large, it may unduly impede the air flow through the filter and adversely effect the performance of the filter. It has also been found that when used with most standard sized residential air filters, it is desirable that the head portion 26b' have an area of no greater than about 10 in$^2$ (65 cm$^2$). Head portions 26b' having larger areas, however, may be used depending on the type of filter and the operating conditions. To minimize any adverse impact the head portion 26b' may have on the air flow through the filter, the head portion may optionally contain holes or openings (not shown) that allow air to pass through the head portion 26b'.

Figure 6:
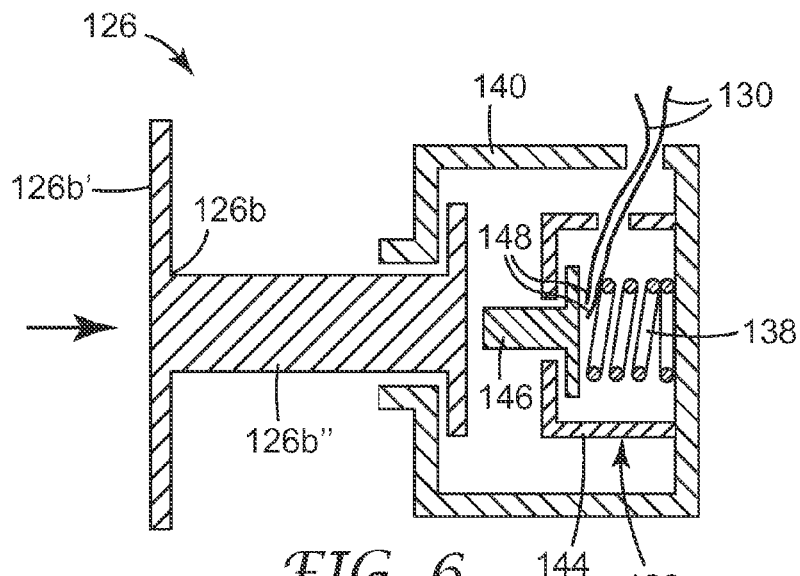
FIG. 6 is a diagrammatic cross-sectional side view of a first alternate filter change indicator.

Referring now to FIG. 6, wherein functionally similar features to those in FIGS. 1-5 are referred to with like reference numerals incremented by 100, an alternate filter change indicator 126 in which the biasing member 138 is incorporated into the switch 126a itself is shown. The change indicator 126 includes a housing 140, a switch 126a arranged in the housing 140 and which is triggered when a pre-determined force is applied to the filter change indicator 126, a filter engagement member 126b movably connected with the housing 140, which is contacted by the interior filtering region 16a of the filter 16 and actuates the switch 126a when the filter 16 bows in response to air flow, and a biasing member 138 arranged to resist a force applied to the filter engagement member 126b. The switch 126a includes an enclosure 144, a plunger 146 movably connected with the enclosure 144, a biasing member 138 arranged between the plunger 146 and the housing 140, and a pair of contacts 148 arranged to be contacted by the plunger 146 when the plunger 146 is urged toward the contacts 148 by the filter engagement member 126b.

It will be recognized that the filter change indicator 26 may itself be a switch having a biasing member (which has an appropriate biasing force) incorporated into the switch. Such a switch may be similar to the switch 126a shown in FIG. 6, so long as it includes a suitable contact surface for contacting the interior filtering region 16a of the filter 16 that would allow the plunger 146 to contact the contacts 148 and, thereby, actuate the switch 126a. In the case where the filter change indicator itself is a switch, the particular switch is not significant, so long as it includes a biasing member that provides the desired function of resisting a force applied to the filter engagement member.

Figure 7:
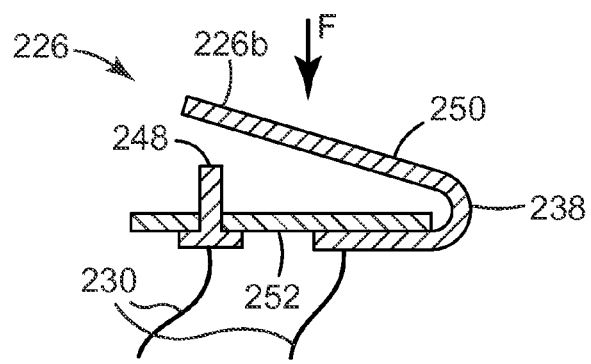
FIG. 7 is a diagrammatic cross-sectional side view of a second alternate filter change indicator.

FIG. 7—wherein functionally similar features to those in FIGS. 1-5 are referred to with like reference numerals incremented by 200—illustrates a filter change indicator 226 in which the filter change indicator 226 itself is a switch. The switch/filter change indicator 226 includes a cantilevered spring member 250 that serves as both a filter engagement member and a biasing member. Thus, the cantilevered spring member 250 may be thought of as having a filter engagement portion 226b and a biasing portion 238. The biasing portion 238 serves to resist a force "F" applied to the filter engagement portion 226b. The switch 226 includes a non-electrically conductive support member 252, to which one end of the cantilevered spring member 250 is secured, and a contact 248. The contact 248 is arranged to engage the filter engagement portion 226b of the spring member 250 when the force F generated by the bowing filter overcomes the resisting force of the biasing portion 238. That is, when the force F generated by the bowing filter exceeds the resisting force of the biasing portion 238, the filter engagement portion 226b engages the contact member 248 and, thereby, triggers the switch to notify an individual that the filter is in need of cleaning or replacement.

Because some filters may lose efficiency over time without exhibiting significant pressure drop or loading, in some end-use applications, it may be desirable to use the filter change indicator 26 in combination with a conventional timer (not shown) that informs a user to replace the filter at a certain time regardless of whether the filter change indicator 26 has signaled the need to clean or replace the filter.

Persons of ordinary skill in the art may appreciate that various changes and modifications may be made to the invention described above without deviating from the inventive concept. For example, although the present invention is shown and described in connection with a portable air purification unit, it will be recognized that it may also be incorporated into a permanent central residential or commercial HVAC system. In addition, the filter change indicator may be designed into new systems or may be retrofit into existing systems. The present invention may also be used with disposable filters that are replaced when a certain predetermined level of loading is reached, or the present invention may be used with reusable filters that may be cleaned and subsequently reused when a certain predetermined level of loading is reached. The present invention is also not limited for use with air filters but may be used in conjunction with any variety of fluid filters including other filters for gases as well as liquids filters. Thus, the scope of the present invention should not be limited to the structures described in this application, but only by the structures described by the language of the claims and the equivalents of those structures.

What is claimed is:

1. An air filter monitoring system for indicating when to clean or replace a flexible air filter, the air filter monitoring system comprising:
   (a) a pleated flat-panel air filter having a peripheral frame and an interior filtering region;
   (b) a fixed support structure for receiving the air filter and maintaining the perimeter of the filter frame in a generally fixed position while allowing the interior filtering region to flex in response to air flow through the filter; and
   (c) a filter change indicator having a predetermined bias force, the filter change indicator including a housing, a position sensitive electrical switch arranged in the housing, a filter engagement member arranged to actuate the switch, and a biasing member arranged to resist a force applied to the filter engagement member by the interior filtering region upon flexing of the filter, wherein as the interior filtering region flexes in response to air flow through the filter, the interior filtering region exerts a force on the filter engagement member that increases with the degree of clogging of the filter and, when the predetermined bias force is reached, the filter engagement member triggers the switch to notify a user to clean or replace the filter.

2. An air filter monitoring system as defined in claim 1, wherein the biasing member establishes the predetermined bias force and is at least one of a spring, a resilient material, or a gas filled bladder.

3. An air filter monitoring system as defined in claim 1, wherein the biasing member is a helical spring arranged around the filter engagement member.

4. An air filter monitoring system as defined in claim 3, wherein the filter engagement member includes an extension arm portion and a head portion connected with the extension arm portion, and further wherein the helical spring is arranged around the arm portion between the housing and the head portion.

5. An air filter monitoring system as defined in claim 4, wherein the head portion includes openings to minimize the impact the head portion has on the flow of air through the filter.

6. An air filter monitoring system as defined in claim 1, wherein the filter engagement member and the biasing member are provided as part of a cantilevered spring member secured to a support member.

7. An air filter monitoring system as defined in claim 1, wherein the filter change indicator is arranged adjacent the downstream side of the filter adjacent the interior filtering region.

8. An air filter monitoring system as defined in claim 7, wherein the filter change indicator is arranged to contact the interior filtering region of the filter before the switch is activated.

9. An air filter monitoring system as defined in claim 8, wherein the filter change indicator is arranged to contact the interior filtering region of the filter when air is flowing through a new clean filter.

10. An air filter monitoring system as defined in claim 1, wherein the filter has a pleated filter media defining a periphery and the peripheral frame is affixed to an entirety of the periphery, the filter being constructed to filter air in a stream moving in a direction generally orthogonal to opposed major surfaces of the filter.

11. An air filter monitoring system as defined in claim 1, wherein the support structure is provided as part of a portable self-contained room air purification system.

12. An air filter monitoring system as defined in claim 1, wherein the support structure is provided as part of a central residential air handling system.

13. A portable room air purifying device, comprising:
   (a) a chassis including an air filtering chamber having an air inlet opening and an air discharge opening;
   (b) a pleated flat-panel filter mounted in the filtering chamber between the inlet and the discharge openings, the filter including a peripheral frame mounted in a fixed position relative to the chassis and including a flexible interior filtering region comprising fibrous filter media that bows outwardly with respect to the frame when air flows through the filter; and
   (c) a filter change indicator arranged at a predetermined stationary location relative to the chassis, the filter change indicator having a predetermined bias force, the filter change indicator including a housing, a position sensitive electrical switch arranged in the housing, a filter engagement member arranged to actuate the switch, and a biasing member arranged to resist a force applied to the filter engagement member by the interior filtering region upon flexing of the filter, wherein as the interior filtering region flexes in response to air flow through the filter, the interior filtering region exerts a force on the filter engagement member that increases with the degree of clogging of the filter and, when the predetermined bias force is reached, the filter engagement member triggers the switch to notify a user to clean or replace the filter.

* * * * *